(12) United States Patent
Marquardt-Stammberger et al.

(10) Patent No.: US 9,334,785 B2
(45) Date of Patent: May 10, 2016

(54) EXHAUST GAS TREATMENT DEVICE (71) Applicants: Michael Marquardt-Stammberger, Münsingen (DE); Robert Hanitzsch, Kernen (DE); Remus Boriga, Wernau (DE); Joachim Braun, Esslingen (DE)

(72) Inventors: Michael Marquardt-Stammberger, Münsingen (DE); Robert Hanitzsch, Kernen (DE); Remus Boriga, Wernau (DE); Joachim Braun, Esslingen (DE)

(73) Assignee: Eberspaecher Exhaust Technology GmbH & Co. KG, Neunkirchen (DE)

( * ) Notice: Subject to any disclaimer, the term of this patent is extended or adjusted under 35 U.S.C. 154(b) by 526 days.

(21) Appl. No.: 13/721,976

(22) Filed: Dec. 20, 2012

(65) Prior Publication Data
US 2013/0180233 A1 Jul. 18, 2013

(30) Foreign Application Priority Data
Dec. 27, 2011 (DE) .......................... 10 2011 089 969

(51) Int. Cl.
*F01N 3/24* (2006.01)
*F01N 13/08* (2010.01)
*F01N 3/28* (2006.01)
*B01F 5/00* (2006.01)
*B01F 5/04* (2006.01)
*B01F 3/02* (2006.01)

(52) U.S. Cl.
CPC . *F01N 13/08* (2013.01); *B01F 3/02* (2013.01); *B01F 5/0082* (2013.01); *B01F 5/0485* (2013.01); *F01N 3/2892* (2013.01); *F01N 2240/20* (2013.01); *F01N 2470/18* (2013.01); *F01N 2490/08* (2013.01)

(58) Field of Classification Search
CPC ........ B01F 3/02; B01F 5/0082; B01F 5/0483; B01F 5/0485; B01F 5/0616; B01F 5/0641; B01F 5/0644; B01F 5/0688; F01N 3/2892; F01N 2240/20; F01N 2470/16; F01N 2470/18; F01N 2490/08; F01N 1/083; F01N 1/086–1/088; F01N 3/06; F01N 2470/08; F01N 2470/14
See application file for complete search history.

(56) References Cited

U.S. PATENT DOCUMENTS

| 3,852,042 | A | | 12/1974 | Wagner | |
|---|---|---|---|---|---|
| 4,206,178 | A | * | 6/1980 | Oya et al. ....................... | 422/176 |
| 5,220,789 | A | * | 6/1993 | Riley et al. ............. | B60K 13/04 181/240 |
| 6,698,193 | B2 | * | 3/2004 | Duerr et al. ..................... | 60/302 |
| 2002/0017097 | A1 | | 2/2002 | Maus | |
| 2009/0266064 | A1 | | 10/2009 | Zheng et al. | |
| 2011/0167810 | A1 | | 7/2011 | Lebas et al. | |

FOREIGN PATENT DOCUMENTS

| DE | 19905032 A1 | 8/2000 |
|---|---|---|
| EP | 1908932 A2 | 4/2008 |

(Continued)

*Primary Examiner* — Jonathan Matthias
(74) *Attorney, Agent, or Firm* — Reinhart Boerner Van Deuren P.C.

(57) ABSTRACT

The present invention relates to an exhaust gas treatment device (4) and an exhaust system (1) having such an exhaust gas treatment device (4), wherein the exhaust system (1) has at least one exhaust-gas-conducting exhaust gas feed line (2, 3), which is attached to an inlet region (16) of the exhaust gas treatment device (4). Improved mixing of the exhaust gas and a space-saving configuration result if the exhaust gas treatment device (4) has at least one inlet (12, 13) which is open towards the inlet region (16) and if a mixing element (15) is provided, which connects the inlet region (16) to a through-flow region (17) by means of input openings (22, 23), wherein at least one first input opening (22) faces a first side (18) of the inlet region (16) and at least one second input opening (23) faces a second side (19) of the inlet region (16).

13 Claims, 2 Drawing Sheets

(56) References Cited

FOREIGN PATENT DOCUMENTS

| FR | 2215535 | A1 | 8/1974 |
| FR | 2422029 | A1 | 11/1979 |
| JP | | 59-130018 | 8/1984 |
| JP | | 2002306928 A | 10/2002 |
| JP | | 2011519400 A | 7/2011 |
| WO | WO 2008/144385 | A2 | 11/2008 |

\* cited by examiner

EXHAUST GAS TREATMENT DEVICE

CROSS-REFERENCE TO RELATED PATENT APPLICATIONS

This patent application claims priority to German Patent Application No. 102011089969.3, filed Dec. 27, 2011, the entire teachings and disclosure of which are incorporated herein by reference thereto.

FIELD OF THE INVENTION

The present invention relates to an exhaust gas treatment device for an exhaust system of an internal combustion engine, preferably of a motor vehicle, which has a housing, which encloses an exhaust gas treatment chamber. The invention also relates to an exhaust system having such an exhaust gas treatment device.

BACKGROUND OF THE INVENTION

An exhaust system is used to conduct away an exhaust gas produced by the internal combustion engine and has been known for a long time from the prior art. The exhaust gas of the internal combustion engine can contain undesirable or harmful constituents, which must be reduced or which should be removed from the exhaust gas before the exhaust gas exits into the environment. To this end, an exhaust gas treatment device is usually provided, which has an exhaust gas treatment chamber through which the exhaust gas can flow and which is enclosed by a housing of the exhaust gas treatment device. A catalyst and/or particle filter is generally arranged inside the exhaust gas treatment chamber in order to clean the exhaust gas of the said undesirable and harmful constituents. Such an exhaust system can be designed in a two-streamed manner from the internal combustion engine to the exhaust gas treatment device and correspondingly have two exhaust gas feed lines, which conduct the exhaust gas produced by the internal combustion engine in separate streams to the common exhaust gas treatment device, the respective exhaust gas feed line being fluidically connected to the exhaust gas treatment device. The fluidic connection of the respective exhaust gas feed line is usually realised in such a manner that the exhaust gas feed lines run substantially parallel to the exhaust gas treatment chamber and open into the exhaust gas treatment chamber in parallel.

The disadvantage of this is that the exhaust gas conducted by the respective exhaust gas feed line runs separately inside the exhaust gas treatment chamber, especially at high speeds of the exhaust gas, which can sometimes be up to ⅔ the speed of sound and higher, and is thus not mixed and does not flow through the exhaust gas treatment chamber uniformly. However, mixing of the exhaust gas conducted away by the respective exhaust gas feed line before flowing through the respective catalyst and/or particle filter, and/or a uniform flow through the respective catalyst and/or particle filter is desired in order to ensure for example uniform treatment of the exhaust gas. Furthermore, the exhaust system can have a measurement device downstream of the exhaust gas treatment device, which measurement device measures certain constituents of the exhaust gas such as the concentration of nitrogen oxides. A virtually separate flow of the exhaust gas conducted by the exhaust gas feed line through the exhaust gas treatment device does not however permit any reliable statements about the measured values, because in case of doubt, that is, in particular in the case of two-streamed exhaust systems and correspondingly high speeds of the exhaust gas, it would only be possible to attribute the said measured values to one of the respective exhaust gas feed lines.

SUMMARY OF THE INVENTION

The present invention is concerned with the problem of specifying for an exhaust gas treatment device for an exhaust system of an internal combustion engine and for such an exhaust system, a better or at least alternative embodiment, which has in particular improved mixing of the exhaust gas from at least one exhaust-gas-conducting exhaust gas feed line in the exhaust gas treatment device.

This problem is solved according to the invention by the subject matter of the independent claims. Advantageous embodiments of the invention are the subject of the dependent claims.

The present invention is based on the general concept of providing an exhaust gas treatment device with at least one inlet which allows exhaust gas to be fed to the exhaust gas treatment device from at least one side, and mixing the exhaust gas flowing in from the respective inlet with the aid of a mixing element before the then mixed exhaust gas reaches a through-flow region of the exhaust gas treatment device. It is thus in particular possible to mix the exhaust gas flowing in from the respective inlet even at correspondingly high speeds of the exhaust gas and to ensure uniform and homogeneous flow of the exhaust gas stream flowing through the at least one inlet through the through-flow region and consequently also uniform and homogeneous treatment of the exhaust gas in the exhaust gas treatment device.

The exhaust gas treatment device is therefore used to treat the exhaust gas which originates from an internal combustion engine, the exhaust gas treatment device preferably being designed for use in an exhaust system. The exhaust gas treatment device is in particular provided for use for such an exhaust system of an internal combustion engine of a motor vehicle, it being possible in particular for the exhaust gas treatment device to be arranged in the region of the underbody of the associated vehicle.

According to the concept of the invention, the exhaust gas treatment device has a housing, which encloses an exhaust gas treatment chamber of the exhaust gas treatment device. The said mixing element divides the exhaust gas treatment chamber into an inlet region and the through-flow region, the inlet region being arranged on the upstream side in the exhaust gas treatment chamber, while the through-flow region is arranged on the downstream side in the exhaust gas treatment chamber. The inlet region and the through-flow region are preferably enclosed by the common housing, the housing having on the inlet side at least one inlet which is open towards the inlet region and is used to attach at least one associated exhaust gas feed line of the said exhaust system. The at least one inlet which is arranged on the inlet side and is open towards the inlet region is in this case arranged laterally or frontally of the inlet region. Also, the mixing element has at least two input openings, namely at least one first input opening which connects the inlet region fluidically to the through-flow region and at least one second input opening which connects the inlet region fluidically to the through-flow region. In this case the at least one first input opening faces a first side of the inlet region, while the at least one second input opening faces a second side of the inlet region. In other words, the respective first inlet opening and the respective second inlet opening face different sides, which are spaced apart from each other and in particular face away from each other. Preferably, the first side and the second side are arranged differently, so that the at least one first input opening and the at least one second input opening face different sides of the inlet region. The respective input openings facing these sides then ensure that exhaust gas flowing in through the at least one inlet is mixed before it flows through the through-flow region.

The first input opening and the second input opening are preferably configured in such a manner and/or face such a first side or such a second side in such a manner that the exhaust gas flowing through the first input opening into the through-flow region has a first flow direction, which has at least one other, in particular opposite direction component in comparison to the exhaust gas flowing through the second input opening into the through-flow region in a second flow direction. The exhaust gas flowing through the first input opening and the exhaust gas flowing through the second input opening thus meet each other in the through-flow region. This achieves better mixing of the exhaust gas.

Better mixing of the exhaust gas is in particular also achieved in that the first side and the second side are preferably arranged laterally on the inlet region, that is, in particular not frontally on the inlet region. In the present case, "frontally" means in particular the section of the inlet region which is opposite the through-flow region. This therefore means that the first side and the second side each have at least one lateral, non-frontal component. The first side and the second side can in particular be opposite each other.

Owing to the connection of the inlet region to the through-flow region, the first input opening defines a first input cross section, while the second input opening defines a second input cross section. Configurations are preferred in which the first side and the second side or the first input opening and the second input opening are configured or arranged in such a manner that a first normal of the first input cross section which points to the first side has at least one different direction component from a second normal of the second cross section which points to the second side. The respective input cross section does not necessarily have to be configured or formed to be flat. Embodiments in which at least one of the input cross sections is curved are in particular conceivable. The said other direction component can in particular be provided in that the corresponding direction components of the first normal and the second normal are directed in opposite directions. In this case, the first input opening and the second input opening can in particular be open towards opposite sides of the inlet region.

If the mixing element has two or more first input openings, the first input openings can have first input cross sections with the same shape and/or size. Configurations are also conceivable in which the first input cross sections of the first input openings have different shapes and/or sizes. This applies correspondingly to the second input openings and the associated second input cross sections. Embodiments are preferred in which the at least one first normal of the at least one first input cross section has at least one different direction component from the at least one second normal of the at least one second input cross section.

Preferably, the housing has on the inlet side two inlets which are open towards the inlet region and are used to attach associated exhaust gas feed lines of the said exhaust system. A first inlet, which is arranged on the inlet side and is open towards the inlet region, is in this case arranged on the first side of the inlet region, whereas a second inlet-side inlet which is open towards the inlet region is arranged on the second side of the inlet region. Also, the mixing element has at least two input openings of the said type, namely at least one such first input opening which connects the inlet region fluidically to the through-flow region and at least one such second input opening which connects the inlet region fluidically to the through-flow region. In this case the at least one first input opening faces the first side of the inlet region, that is, the first inlet, while the at least one second input opening faces the second side of the inlet region, that is, the second inlet. In other words, the at least one first input opening faces the side of the inlet region on which the first inlet is arranged, whereas the at least one second input opening faces the side of the inlet region on which the second inlet is arranged. Preferably, the first side and the second side are arranged differently, so that the exhaust gas flows out of different sides to the inlet region. The respective input openings facing these sides then ensure that the exhaust gas in each case flowing in from the different inlets is mixed before it can flow through the through-flow region.

For the sake of simplicity, it is assumed below that the exhaust gas treatment device has at least one such first inlet and at least one such second inlet. It is understood however that the description given below can be transferred analogously to an exhaust gas treatment device having only one such inlet or having more than two inlets.

The respective inlets can for example be worked into the housing of the exhaust gas treatment device, for instance stamped or cut out. It is also possible to form the inlets by a corresponding method of moulding the housing in the inflow region.

Improved mixing of the exhaust gas flowing into the inflow region through the respective inlets is achieved in that the first side and the second side of the inlet region are spaced apart from each other transversely to the longitudinal direction of the housing and are opposite each other. This means in particular that exhaust gas flowing into the inlet region through one of the inlets has a flow direction which is substantially directed counter to the flow direction of the exhaust gas flowing through the other inlet, which can result in the exhaust gas already being partially mixed in the inlet region. In this case embodiments in which the first side and the second side are diametrically opposite are particularly preferred. This results in optimal utilisation of the inlet region in the sense of a maximised or enlarged flow path of the exhaust gas flowing in from the respective inlet. In these embodiments, the first side and the second side are consequently opposite each other in a spacing direction. Accordingly, the at least one first input opening and the at least one second input opening face away from each other, that is, are open towards the inlet region in opposite directions.

The arrangement of the input openings in a central region of the mixing element results in an improved effect of the mixing element, the input openings expediently being arranged centrally in relation to the spacing direction. Such an arrangement of the input openings likewise results in an extended flow path of the exhaust gas flowing in from the respective inlet, the central positioning resulting in the substantial mixing of the exhaust gas taking place directly downstream of the mixing element, because the exhaust gas flowing in from the first inlet flows substantially through the at least one first input opening, while the exhaust gas flowing in from the second inlet substantially flows through the at least one second input opening.

This effect can be increased in that the at least one first input opening and the at least one second input opening are arranged offset with respect to each other. Preferably, the offset arrangement of the respective input openings is transverse to the spacing direction in such a manner that the at least one first input opening is formed offset to the at least one second input opening transversely to the spacing direction, this offset arrangement preferably being perpendicular to the spacing direction. If the mixing element has a plurality of first input opening and/or a plurality of second input openings, preferably all the first input openings are arranged offset to all the second input openings and alternating with each other transversely to the spacing direction.

The exhaust gas flowing into the inlet region from the respective inlet can be conducted to the associated input opening with the aid of at least one flow channel. Such a flow channel is preferably formed as a depression in the mixing element, which in particular leads to the associated input opening or into the associated input opening. It is understood, however, that the exhaust gas does not necessarily flow to the associated input opening exclusively via the respective flow channel. The flow channel expediently runs along the spacing direction and thus substantially along the flow direction of the exhaust gas which flows in from the associated inlet. The flow channel in this preferably has a conical profile towards the associated input opening. This means that the flow channel widens or enlarges or tapers or narrows towards the associated input opening. Expediently, the depression forming the flow channel is without edges and corners to allow the exhaust gas to flow as frictionlessly as possible. However, other embodiments are conceivable in which the depression does have edges or corners in order to produce increased eddying in the inlet region. Embodiments are preferred in which all the input openings are assigned such an associated flow channel each, the flow channels or depressions which are assigned to one of the sides being arranged offset to the flow channels or depressions which are assigned to the other side, expediently transversely to the spacing direction.

The exhaust gas flowing through the respective input opening is usually deflected by the rear of the mixing element, which faces away from the inlet region, and mixed with the exhaust gas which flows through the at least one other input opening and is likewise deflected by the rear of the mixing element, and is conducted into the through-flow region. In this case, a buildup of what is known as a counter-pressure can occur, which forms a great load on the mixing element. In order in particular to counteract this, the mixing element has at least one perforation region which has a perforation in preferred embodiments. The perforated perforation region then allows the exhaust gas to reach the through-flow region via other regions in addition to the input openings, which results in a reduction in the said counter-pressure. The at least one perforation region and/or the associated perforation are preferably designed in such a manner that the exhaust gas flows through the input openings. The at least one perforation region can in particular be arranged partially or entirely inside at least one such depression or run along at least one such depression. The entire area of the mixing element can also have a perforation.

The perforation can in this case have any desired shape. In particular, the perforation is formed by round and/or angular and/or slot-like or groove-like cut-outs in the mixing element.

In preferred embodiments, the perforation region is arranged between the depressions. At least one of the flow channels, which is assigned to one of the sides, and one of the perforation regions, which is arranged between the depressions of the other side, can thus run substantially along a line which runs parallel to the spacing direction. In other words, a perforation region assigned to the first side and a flow channel assigned to the second side are adjacent in the spacing direction. This means in particular that the exhaust gas which is conducted through such a flow channel to the associated input opening meets an opposite perforation assigned to the other side after flowing through the said input opening, so that the said effect, namely a partial deflection and a partial flow back into the inlet region, is optimised. Embodiments are preferred in which flow channels and perforation regions of the one or the other side alternate transversely to the spacing direction, while in each case one flow channel and one input opening of the first side and such a perforation region of the second side run on lines running parallel to the spacing direction. The same applies to flow channels and associated input openings of the second side and perforation regions of the first side.

According to a further preferred embodiment, at least one of the inlets, but preferably both, is inclined towards the longitudinal direction of the housing. This means that the normal of the inlet runs in an inclined manner to the longitudinal direction of the housing. The inlets are preferably formed or arranged symmetrically in such a manner that an inclination angle of the incline of one of the inlets corresponds to the negative value of the inclination angle of the other inlet in relation to the longitudinal direction of the housing. The inclined arrangement or formation of the respective inlet optimises or improves flow to the mixing element. Furthermore, such a formation or arrangement of the inlets allows a space-saving construction of the exhaust gas treatment device and the associated exhaust system. In this case the inclination angle is for example between 30° and 90°, the inclination angle preferably being at least 45°.

For the further improvement of the flow to the mixing element, the mixing element is curved in a preferred variant. The curvature is in this case preferably given in relation to the inlet region. The mixing element can then be convex in some regions towards the inlet region and concave in some regions towards the inlet region, the mixing element preferably being concave in the region of one side and convex in the region of the other side. It is also conceivable that the central region of the mixing element has a different curvature from the region associated with the first and second sides. The mixing element is preferably substantially convex towards the inlet region. This means substantially that the at least one depression and/or the associated flow channel expediently do(es) not have a convex shape towards the inlet region.

The mixing element can be produced from sheet metal, preferably from a single-piece sheet metal part by a shaping process, deep-drawing and punching. Such a mixing element is cheap to produce, so the production costs of the exhaust gas treatment device can be reduced. However, mixing elements are also conceivable which are produced from other materials and using other methods, if they are suitable for the conditions, in particular the thermodynamic conditions, prevailing in the exhaust gas treatment device.

To improve the flow of the exhaust gas in the inlet region, an end wall of the housing of the exhaust gas treatment device, which delimits the inlet region on the upstream side, can likewise be curved. The end wall is in this case preferably formed in such a manner that it is convex towards the mixing element. The exhaust gas treatment device can thus have the shape of a curved tube in the region of the inflow region, which in particular allows a space-saving construction of the exhaust gas treatment device. Depending on the installation situation or conditions in the installation space, it can however also be advantageous to make the end wall curved in a different manner, for example concave towards the mixing element, or flat.

The treatment of the exhaust gas takes place preferably in the through-flow region of the exhaust gas treatment chamber, that is, downstream of the mixing element. At least one exhaust gas treatment element can be arranged in the through-flow region. Such an exhaust gas treatment element is for example a catalyst and/or particle filter. Such a catalyst or a plurality of catalysts and/or such a particle filter or a plurality of particle filters can also be arranged in any order in the through-flow region. The order of this arrangement can be adapted to the respective requirements. For example, an oxidation catalyst, a NOX catalyst, a three-way catalyst and an SCR catalyst can be used as the catalyst, it being possible for the respective catalyst to formed or configured monolithically. A diesel particle filter and a petrol particle filter can be used as the particle filter.

According to an advantageous development of the solution according to the invention, the exhaust gas treatment device is part of an exhaust system. In this case a first exhaust-gas-conducting exhaust gas feed line of the exhaust system is attached to the first inlet of the exhaust gas treatment device. A second exhaust-gas-conducting exhaust gas feed line is also attached to the second inlet of the exhaust gas treatment device. The respective exhaust gas feed line is for example attached to an associated internal combustion engine by means of an exhaust manifold, so that the exhaust gas produced by the internal combustion engine flows to the exhaust gas treatment device via both exhaust gas feed lines. The exhaust gas flowing through the respective exhaust gas feed line to the exhaust gas treatment device is mixed in the exhaust gas treatment device, in particular with the aid of the mixing element, so that a homogeneous and uniform treatment of the exhaust gas can take place in the through-flow region which runs or is arranged downstream of the mixing element and in which the said catalysts and/or particle filters can be arranged.

The exhaust system can also have an exhaust gas discharge line downstream of the exhaust gas treatment device, which is attached to an outlet of the exhaust gas treatment device which is arranged and/or formed on the downstream side of the exhaust gas treatment chamber or the exhaust gas treatment device in order to discharge the exhaust gas from the exhaust gas treatment device. The exhaust system can also have a measurement device for determining concentrations of constituents of the treated exhaust gas. Such a measurement device is particularly suitable for determining the nitrogen oxide contents and is for example designed as a NOX probe. The measurement device can be arranged in an opening of the exhaust gas discharge line. Mixing of the exhaust gas inside the exhaust gas treatment device and homogeneous treatment in the through-flow region allow reliable determinations by the measurement device.

It is understood that the concept relevant to the invention can be applied analogously to an exhaust gas treatment device having more than two inlets without departing from the scope of this invention, at least two of these inlets being arranged on two different sides of the inlet region. This applies correspondingly to an exhaust system which has more than two exhaust gas feed lines, the number of exhaust gas feed lines expediently corresponding to the number of inlets.

It should further be mentioned that the mixing element as such belongs within the scope of this invention.

Further important features and advantages of the invention result from the sub-claims, from the drawings and from the associated description of the figures on the basis of the drawings.

It is to be understood that the previously mentioned features and the features which are still to be mentioned in the following, can be used not only in the respectively specified combination, but also in other combinations or alone, without departing from the context of the present invention.

BRIEF DESCRIPTION OF THE DRAWINGS

Preferred exemplary embodiments of the invention are illustrated in the drawings and are described in more detail in the following description, wherein identical reference numbers refer to identical or similar or functionally identical components.

In the figures.

DETAILED DESCRIPTION OF THE INVENTION

Figure 1:
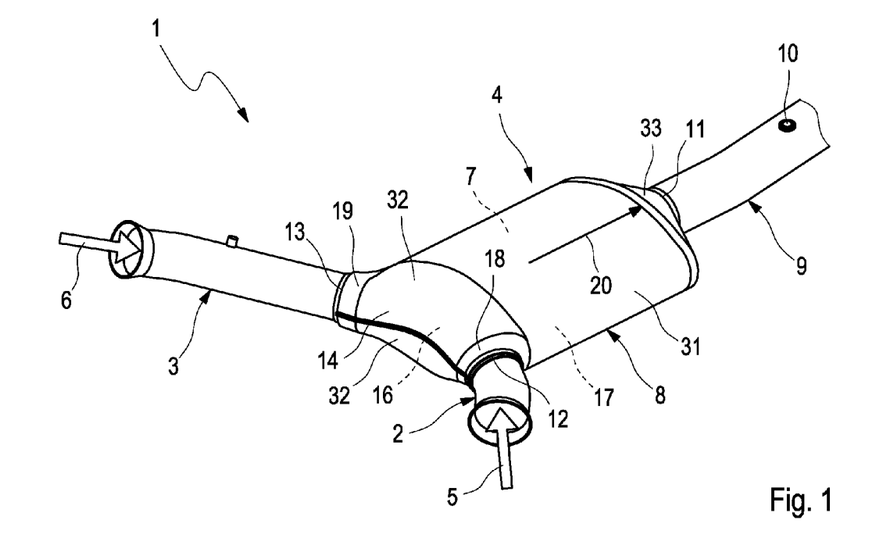
FIG. 1, schematically shows an isometric external view of an exhaust system.
Figure 2:
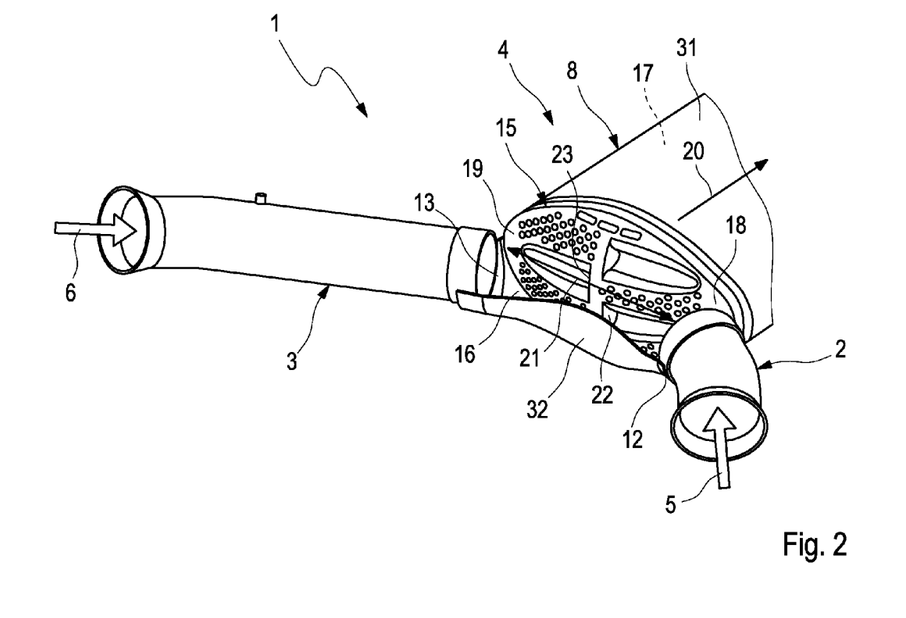
FIG. 2, schematically shows an external view of the exhaust system with an open inlet region, FIG. 3, schematically shows an isometric view of a mixing element, FIG. 4, schematically shows a side view of the partially open exhaust system.

FIG. 1 and FIG. 2 show an exhaust system 1, which has a first exhaust gas feed line 2 and a second exhaust gas feed line 3, which are shown partially here. The exhaust gas feed lines 2, 3 of the exhaust system 1 are each fluidically connected to an internal combustion engine (not shown), the exhaust gas of which they conduct to an exhaust gas treatment device 4 of the exhaust system 1. The exhaust gas flowing through the first exhaust gas feed line 2 is indicated with an arrow 5 and is referred to below as the first exhaust gas stream 5, while the exhaust gas flowing in the second exhaust gas feed line 3 is indicated with another arrow 6 and is referred to below as the second exhaust gas stream 6. The first exhaust gas stream 5 and the second exhaust gas stream 6 flow to the exhaust gas treatment device 4 and flow through an exhaust gas treatment chamber 7 of the exhaust gas treatment device 4, which is enclosed by a housing 8 of the exhaust gas treatment device 4. The exhaust system 1 has an exhaust gas discharge line 9 downstream of the exhaust gas treatment device 4, which is connected fluidically to the exhaust gas treatment chamber 7 or the exhaust gas treatment device 4 and discharges the exhaust gas from the exhaust gas treatment device 4. The exhaust gas discharge line 9 has an opening 10, in which a measurement device such as a NOX probe can be arranged in order to determine the concentration of for example nitrogen oxides in the exhaust gas treated in the exhaust gas treatment device 4. The fluid connection between the exhaust gas discharge line 9 and the exhaust gas treatment device 4 is realised with the aid of an outlet 11, which is formed at the downstream-side end region of the exhaust gas treatment device 4, the downstream-side end region 33 being funnel-shaped.

The attachment of the exhaust gas feed lines 2, 3 to the exhaust gas treatment device 4 is realised by means of inlets 12, 13 of the exhaust gas treatment device 4, which are arranged on the inlet side of the housing 8. At the inlet-side end, the housing 8 has an end wall 14, which is convex towards the outlet side. In principle, the exhaust system can also have a single such exhaust gas feed line 2, 3, the exhaust gas treatment device 4 in this case having a single such inlet 12, 13.

The exhaust gas treatment device 4 also has a mixing element 15 (see FIG. 2), which divides the exhaust gas treatment chamber 7 into an inlet-side inlet region 16 and an outlet-side through-flow region 17. A first inlet 12 of the exhaust gas treatment device 4 is open towards the inlet region and arranged on a first side 18 of the inlet region 16. In this case the first exhaust gas feed line 2 is attached to the first inlet 12. A second inlet 13 of the exhaust gas treatment device 4 is also arranged on a second side 19 of the inlet region 16 and is open towards the inlet region 16. The second exhaust gas feed line 3 is attached to the second inlet 13. The first side 18 and the second side 19 are arranged laterally of the inlet region 16. The first exhaust gas stream 5 flows through the first inlet 12 into the inlet region 16, while the second exhaust gas stream 6 passes through the second inlet 13 into the inlet region 16. The first side 18 and the second side 19 of the inlet region 16 are spaced apart from each other transversely to a longitudinal direction 20 of the housing 8 and are diametrically opposite each other. Correspondingly, the first side 18 is opposite the second page 19 in a spacing direction 21. Consequently, the inlets 12, 13 are also spaced apart from each other along the spacing direction 21, the inlets 12, 13 having an incline in relation to the longitudinal direction 20 of the housing 8 and the inclines each having the same value. In this case the inclination angles are preferably between 30 and 90°, but preferably at least 45°. The respect exhaust gas feed lines 2, 3 open laterally and at an inclination angle into the exhaust gas treatment device 4 or into the inlet region 16.

Figure 3:
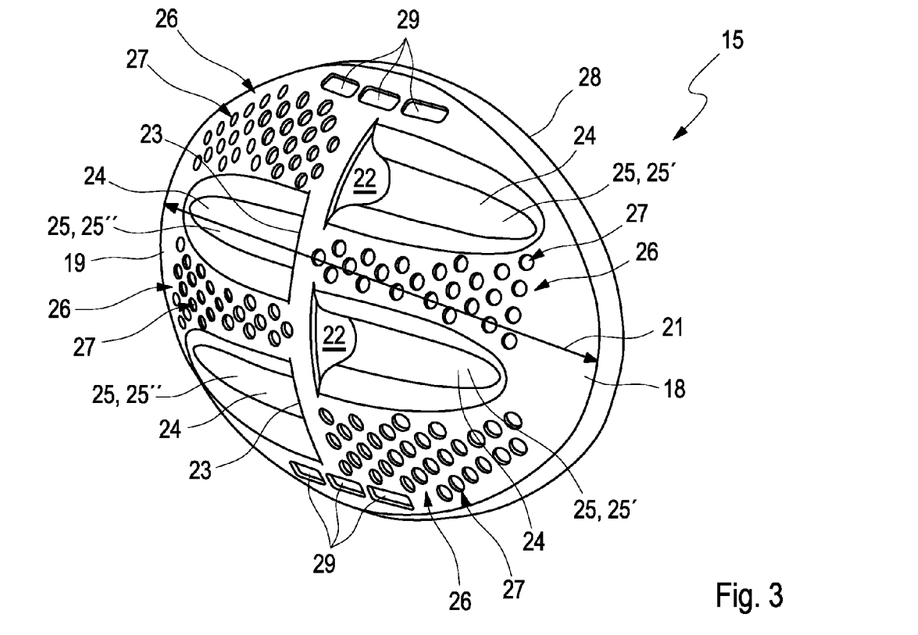

To allow the exhaust gas to flow into the through-flow region 17, the mixing element 15 has input openings 22, 23 which connect the inlet region 16 fluidically to the through-flow region 17, as can be seen in particular in FIG. 3. At least one first input opening 22 is provided, which faces the first side 18, while at least one second input opening 23 is provided which faces the second side 19. The exhaust gas flowing through the at least one first input opening 22 into the through-flow region 17 thereby has a first flow direction, which has at least one other, in particular opposite direction component than a second flow direction of the exhaust gas flowing through the at least one second input opening 23 into the through-flow region 17. In the embodiment shown here, the mixing element 15 has two first input openings 22 and two second input openings 23. The input openings 22, 23 are formed in the centre of the mixing element 15 in the spacing direction 21, the first input openings 22 being arranged closer to the first side 18, whereas the second input openings 23 are arranged closer to the second side 19. The first input openings 22 are also spaced apart from each other transversely to the spacing direction 21. The same applies to the second input openings 23. Furthermore, the first input openings 22 are arranged offset to each other perpendicularly to the spacing direction 21.

Four depressions 24 are also provided, which is each form a flow channel 25. Each of the input openings 22, 23 is assigned such a flow channel 25. In the example shown, all the input openings 22, 23 and all the depressions 24 or flow channels 25 have the same size and shape. The flow channels 25 have a conical profile and taper from the associated input opening 22, 23 towards the associated side 18, 19. The depressions 24 are also without edges and corners in order to allow the exhaust gas to flow as smoothly as possible to the respective input openings 22, 23.

In each case two perforation regions 26 are arranged outside the depressions 24, which are assigned to the first input openings 22, and outside the depressions 24, which are assigned to the second input openings 23. The mixing element 15 thus has four perforation regions 26 in total, in each case one such perforation region 26 being arranged transversely between the first flow channels 25, while one such perforation region 26, when the mixing element 15 is oriented as shown in FIG. 3, is arranged below the lower first input opening 22 or the associated depression 24, and one such perforation region 26 is arranged above the upper second input opening 23 or the associated depression 24. Overall, the mixing element 15 is formed in such a manner that in each case one flow channel 25 runs on the first side 18 or the second side 19 and one perforation region 26 runs on the second side 19 or the first side 18 along one line which runs parallel to the spacing direction 21. The respective perforation region 26 is also perforated or has at least one perforation 27.

Space-saving and at the same time effective mixing of the first exhaust gas stream 5 and the second exhaust gas stream 6 is achieved thereby. This is also achieved in that the mixing element 15 is convex towards the inlet region 16, as can be seen in particular in FIG. 4. The first exhaust gas stream 5 flows through the first inlet 12 and mainly through via the associated flow channels 25' to the first input openings 22, the first exhaust gas stream 5 flowing in the direction of the second side 19. The first exhaust gas stream 5 thus reaches the through-flow region 17 on a rear side 28 of the mixing element 15 which faces away from the inlet region 16. The first exhaust gas stream 5 is deflected on the rear side 28 of the mixing element 15 and flows in the direction of the through-flow region 17. Another part of the first exhaust gas stream 5 flows via the perforations 26 into the passage region 16, in the example shown the perforation regions 27 being formed and arranged or the perforations 27 being shaped in such a manner that the first exhaust gas stream 5 flows into the through-flow region 17 mainly via the first input openings 22. The same applies to the second exhaust gas stream 6, which passes into the through-flow region 17 via the associated flow channels 25" and through the second input openings 23 or via the perforations 27 of the associated perforation regions 26 and meets the rear side 28 of the mixing element 15.

Figure 4:
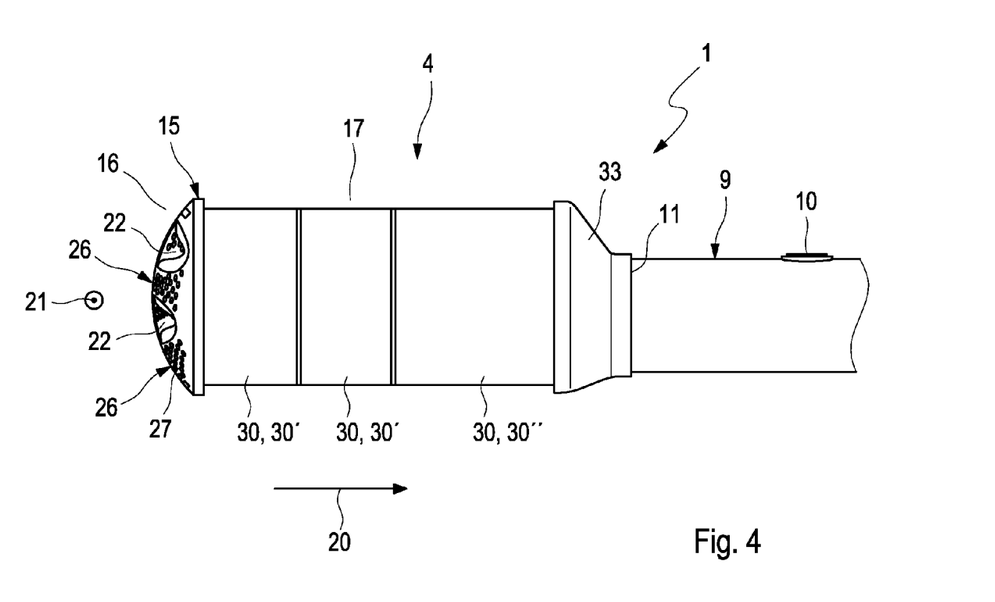

The mixing element 15 has in each case three cut-outs 29 in its end regions which are formed transversely to the spacing direction 21, which cut-outs likewise fluidically connect the inlet region 16 and the through-flow region 17 and thus also form a flow possibility for the exhaust gas. As can be seen in FIG. 4, three exhaust gas treatment elements 30, which are shown in a simplified manner, are arranged along the longitudinal direction 20 of the housing 8 in the through-flow region 17 of the exhaust gas treatment device 4. The mixing of the first exhaust gas stream 5 and the second exhaust gas stream 6 with the aid of the measures on the flow inlet side and the formation of the exhaust gas treatment device 4, in particular with the aid of the mixing element 15 results in both exhaust gas streams 5, 6 flowing uniformly through the exhaust gas treatment elements 30 and being treated correspondingly. The exhaust gas which is then treated and passes into the exhaust gas discharge line 9 is correspondingly homogenised, so that the measurement device, which can for example be arranged in the opening 10 of the exhaust gas discharge line 9, can deliver a reliable and representative result.

Catalysts 30' and/or particle filters 30" can for example be used as the exhaust gas treatment elements 30, it being possible for the arrangement along the longitudinal direction 20 to be adapted to the respective requirements. In the example shown, first two catalysts 30' and then one particle filter 30", in particular a diesel particle filter or petrol particle filter 30"' are arranged along the longitudinal direction 20 by way of example. In particular, monolithically formed or equipped catalysts, for example oxidation catalysts 30' or NOX catalysts 30' are used as the catalysts 30'.

The installation or assembly of the exhaust gas treatment device 4 can for example be realised as follows. The housing 8 of the exhaust gas treatment device 4 is produced by a wound piece of sheet metal 31, as can be seen in particular in FIG. 1. The mixing element 15 is positioned in the piece of sheet metal 31 on the inlet side of the wound piece of sheet metal 31 and in particular pushed in, as can be seen in particular in FIG. 2. The mixing element 15 can then be soldered or welded or connected in another suitable manner to the wound piece of sheet metal 31. The inlet-side end of the housing 8 is formed by two symmetrical sheet metal shells 32; FIG. 2 shows one of the sheet metal shells 32 while both sheet metal shells 32 can be seen in FIG. 1. The sheet metal shells 32 can for their part also be connected, for example welded, to the wound piece of sheet metal 31. As can be seen in particular in FIG. 4, the outlet 11 of the exhaust gas treatment device 4 is realised by the funnel-shaped end region 33, which is in particular produced from sheet metal and can likewise be welded to the piece of sheet metal 31.

The invention claimed is:

1. An exhaust gas treatment device for an exhaust system of an internal combustion engine of a motor vehicle, the device comprising:
   a housing which encloses an exhaust gas treatment chamber;
   a mixing element, which divides the exhaust gas treatment chamber into an upstream-side inlet region and a downstream-side through-flow region by extending completely across the exhaust gas treatment chamber;
   wherein the mixing element has at least one first input opening which connects the inlet region fluidically to the through-flow region and faces a first side of the inlet region;
   wherein the mixing element has at least one second input opening which connects the inlet region fluidically to the through-flow region and faces a second side of the inlet region;
   wherein the mixing element has at least one depression on its side facing the inlet region, the depression forming a flow channel which leads to one of the at least one first or at least one second input openings;
   wherein the mixing element has at least one perforation region including a plurality of perforations, wherein the perforation region is located outside of the at least one depression;
   wherein the housing has on the inlet region a first inlet for attaching a first exhaust gas feed line, the first inlet is open towards the inlet region and is arranged on the first side of the inlet region; and
   wherein the housing has on the inlet region a second inlet for attaching a second exhaust gas feed line, the second inlet is open towards the inlet region and is arranged on the second side of the inlet region.

2. The exhaust gas treatment device according to claim 1 wherein the first side and the second side of the inlet region are spaced apart from each other transversely to the longitudinal direction of the housing and are opposite each other diametrically.

3. The exhaust gas treatment device according to claim 1, wherein the first side of the inlet region is opposite the second side of the inlet region in a spacing direction and that the at least one first input opening and the at least one second input opening are arranged offset to each other transversely to the spacing direction.

4. The exhaust gas treatment device according to claim 1, wherein the first and second input openings are arranged in the center of the mixing element.

5. The exhaust gas treatment device according to claim 1, wherein the flow channel is located on one of the first or second sides of the inlet region and one of the at least one perforation regions is arranged on the other of the first or second sides and is aligned with the flow channel substantially along a line which runs parallel to a spacing direction.

6. The exhaust gas treatment device according to claim 1, wherein a normal direction of at least one of the inlets runs in an inclined manner to a longitudinal direction of the housing.

7. The exhaust gas treatment device according to claim 1, wherein the mixing element is substantially convex towards the inlet region.

8. The exhaust gas treatment device according to claim 1, wherein the housing has in the inlet region an end wall which is opposite the mixing element and is convex towards the mixing element.

9. The exhaust gas treatment device according to claim 1, wherein at least one exhaust gas treatment element, in the form of a catalyst and/or a particle filter, is arranged in the through-flow region.

10. The exhaust gas treatment device according to claim 1, wherein the first side and/or the second side is/are not arranged frontally with respect to the inlet region.

11. The exhaust gas treatment device according to claim 1, wherein an exhaust gas discharge line is attached to a downstream-side outlet of the through-flow region.

12. The exhaust gas treatment device according to claim 11, wherein the exhaust gas discharge line has a measurement device for measuring a nitrogen oxide content, which is arranged in an opening in the exhaust gas discharge line.

13. The exhaust gas treatment device according to claim 1, wherein the flow channel runs substantially parallel to a spacing direction.

* * * * *

UNITED STATES PATENT AND TRADEMARK OFFICE
CERTIFICATE OF CORRECTION

PATENT NO.         : 9,334,785 B2
APPLICATION NO.    : 13/721976
DATED              : May 10, 2016
INVENTOR(S)        : Michael Marquardt-Stammberger et al.

It is certified that error appears in the above-identified patent and that said Letters Patent is hereby corrected as shown below:

In the claims:

Claim 3, line 3: delete the word "that"

Signed and Sealed this
Second Day of August, 2016

Michelle K. Lee
*Director of the United States Patent and Trademark Office*